United States Patent Office 3,121,670
Patented Feb. 18, 1964

3,121,670
FERMENTATIVE PREPARATION OF TETRA-CYCLINE AND 7-CHLOROTETRACYCLINE
Stephen Aloysius Szumski, Pearl River, N.Y., assignor to American Cyanamid Company, New York, N.Y., a corporation of Maine
No Drawing. Filed Nov. 27, 1962, Ser. No. 240,443
4 Claims. (Cl. 195—80)

This invention relates to a novel process of producing antibiotics of the tetracycline series and, more particularly, is concerned with an improved process for the production of tetracycline and 7-chlorotetracycline by fermenting strains of *Streptomyces aureofaciens* in the presence of urea.

In the past, many attempts have been made to increase the yield of tetracycline and 7-chlorotetracycline by fermenting media containing various substances which have been generally referred to in the art as additives. Typical of such substances is cosynthetic factor-1 whose effect in increasing the production of 7-chlorotetracycline by fermentation of mutant *S. aureofaciens* strain S1308 is described in U.S. Patent No. 2,970,947 to J. R. D. McCormick et al.

The present invention is based upon the discovery that the addition of urea to the fermentation medium at least twenty-four hours after inoculation of the medium provides greatly increased yields of antibiotic. According to the present invention the urea is added, preferably about forty-eight hours after medium inoculation, so as to provide a concentration of from about 1.0 g. to about 10.0 g. of urea per liter of medium. The present invention is not to be confused with the use of urea as one of the original constituents of the fermentation medium. According to the practice of the present invention, urea is absent as one of the original constituents of the fermentation medium and is only added at least twenty-four hours after medium inoculation. Preferably, the urea is added in the form of an aqueous solution, sterile filtered, ranging from about 7% to 10% of urea concentration. Sterile filtration can be accomplished by Seitz filtration or by means of a Berkefeld candle. Sterilization by heating is not satisfactory since a considerable part of the urea is destroyed by hydrolysis.

The present invention is not particularly concerned with any specific microorganisms except to the extent that it is concerned with those microorganisms that produce either tetracycline or 7-chlorotetracycline by fermentative biosynthesis. Insofar as is presently known, all such microorganisms are of the genus Streptomyces. The present invention is not predicated upon the selection of any particular species of Streptomyces but, as indicated above, is concerned with the use of urea in a particular manner so as to increase the yield of antibiotic produced in the fermentation.

The conditions of the fermentation for both tetracycline and 7-chlorotetracycline are generally the same as the presently known methods of producing tetracycline or 7-chlorotetracycline by fermentation. That is, the fermentation medium contains the usual nutrients, with the exception of urea, and mineral sustances. Suitable nutrient substances include starch, dextrose, cane sugar, glucose, molasses, soybean meal, peanut meal, yeast, meat extracts, peptone, ammonium sulfate, corn steep liquor, distillers solubles, fish meal and other conventional substances. The inorganic salts include such things as calcium carbonate, ammonium sulfate, ammonium chloride, sodium dihydrogen phosphate, and the various trace elements such as manganese, cobalt, zinc, copper, iron, and the like.

The other general conditions of the fermentation, such as hydrogen ion concentration, temperature, time, rate of aeration, preparation of the inoculum, sterilization, inoculation and the like are conventional and may be similar to those for the production of 7-chlorotetracycline shown in the U.S. patent to Duggar, No. 2,482,-055, and for the production of tetracycline shown in the U.S. patent to Minieri et al., No. 2,734,018.

Similarly, the recovery of the tetracycline and 7-chlorotetracycline from the fermentation liquors is conventional and need not be described as numerous methods of recovering tetracycline and 7-chlorotetracycline from fermentation liquors have been published.

The invention will be described in greater detail in conjunction with the following specific examples.

EXAMPLE 1

*Effects of various Concentrations of Urea*

Spores of *S aureofaciens* were washed from a streaked agar slant with sterile distilled water to form a suspension containing $60$–$80 \times 10^6$ spores/ml. A 0.33 ml. portion of this suspension was used to seed eight-inch shaker tubes containing 8 ml. of a medium prepared according to the following formulation:

| | |
|---|---|
| Sucrose | grams__ 30.0 |
| Corn steep | milliliters__ 16.5 |
| Calcium carbonate | grams__ 7.0 |
| Ammonium sulfate | do____ 2.0 |
| Tap water, q.s. | milliliters__ 1000 |

Prior to seeding, the medium was sterilized by autoclaving for 20 minutes under a pressure of 15 pounds per square inch, during which the pH changed from 6.3 to 6.9. The seeded shaker tubes were then incubated for 24 hours at 25° C. on a reciprocating shaker operating at 116 oscillations per minute. A fermentation medium for 7-chlorotetracycline production was prepared as follows:

| | |
|---|---|
| Corn flour | 14.5 grams per liter. |
| Starch | 47.0 grams per liter. |
| Corn steep liquor | 25.0 grams per liter. |
| Ammonium chloride | 1.7 grams per liter. |
| $CaCO_3$ | 9.0 grams per liter. |
| $(NH_4)_2SO_4$ | 5.6 grams per liter. |
| $MnSO_4$ (70%) | 80.0 milligrams per liter. |
| $CoCl_2.6H_2O$ | 5.0 milligrams per liter. |
| Lard oil | 3% by volume. |

Twenty-five milliliter aliquots of this medium were placed in a series of 250-ml. Erlenmeyer flasks, sealed in each case with a cotton plug, sterilized in an autoclave for 20 minutes at a pressure of 15 pounds per square inch, and cooled to room temperature ($25° \pm 5°$ C.).

After sterilization and cooling, three sets of Erlenmeyer flasks each were variously inoculated with 1.0 ml. of inocula prepared as described previously above. The fermentations were carried out at 25° C. on a rotary shaker operating at 180 r.p.m. After incubation for 48 hours, portions of a 10% aqueous solution of urea were added to the various flasks in amounts so chosen as to yield the concentrations shown in Table I, below. Incubation was then continued at 25° C. for an additional 24 hours, at which time the harvest mash in each flask was assayed for 7-chlorotetracycline content. Test results are shown in Table I, below.

TABLE I.—CONCENTRATIONS OF UREA ADDED AND 7-CHLOROTETRACYCLINE OBTAINED

| Experiment No. 1 | | Experiment No. 2 | | Experiment No. 3 | |
| --- | --- | --- | --- | --- | --- |
| Urea Added, gm./l | CTC [1] Obtained, mcg./ml. | Urea Added, gm./l. | CTC Obtained, mcg./ml. | Urea Added gm./l. | CTC Obtained, mcg./ml. |
| None | 2,700 | None | 1,330 | None | 3,480 |
| 1.26 | 2,830 | 3.98 | 2,530 | 3.15 | 3,880 |
| 1.89 | 3,000 | 4.61 | 2,430 | 3.78 | 4,380 |
| 2.52 | 3,730 | 5.04 | 1,450 | 4.41 | 4,260 |
| 3.15 | 4,030 | 5.67 | 1,450 | 5.04 | 4,180 |
| | | 6.30 | 1,980 | | |

[1] CTC = 7-chlorotetracycline.

EXAMPLE 2

*Effect of Urea Addition on the Production of Tetracycline*

A fermentation medium was made up as follows:

| | |
| --- | --- |
| Corn flour | 14.5 grams per liter. |
| Starch | 47.0 grams per liter. |
| Corn steep liquor | 25.0 grams per liter. |
| Ammonium chloride | 1.7 grams per liter. |
| $CaCO_3$ | 9.0 grams per liter. |
| $(NH_4)_2SO_4$ | 5.6 grams per liter. |
| $MnSO_4$ (70%) | 80.0 milligrams per liter. |
| $CoCl_2 \cdot 6H_2O$ | 5.0 milligrams per liter. |
| Lard oil | 3% by volume. |

To this medium was added 7.5 p.p.m. of 2-(2-furyl)-5-mercapto-1,3,4-oxadiazole, a chlorination inhibitor. The medium was dispensed in appropriate amounts into 2 flasks, sterilized, inoculated with vegetative inoculum of a 7-chlorotetracycline-producing strain of *S. aureofaciens* and incubated at 25° C. for 48 hours on a rotary shaker operating at 180 revolutions per minute. At this point, a portion of a 10% urea solution was added to one of the flasks in an amount to give a concentration of 4 grams of urea per liter. The other flask was retained as a control. Both flasks were again incubated at 25° C. for an additional 48 hours, making a total of 96 hours fermentation in both cases. It should be noted that at 24 hours and at 48 hours after the addition of urea, aliquots of medium were removed from each flask and assayed spectrophotometrically for tetracycline. The results obtained are set forth in Table II below:

TABLE II.—CONCENTRATIONS OF TETRACYCLINE WITH AND WITHOUT ADDITION OF UREA TO FERMENTATION MEDIUM

| Age of Fermentation (Hours) | Tetracycline (mcg./ml.) | |
| --- | --- | --- |
| | No Urea Present | 4 gm./l. Urea Added |
| 72 | 2,450 | 3,440 |
| 96 | 4,230 | 5,470 |

EXAMPLE 3

*Comparison of 7-Chlorotetracycline Yield Variations With Variations in Time of Urea Addition*

Inoculation medium and procedure were the same as that described in Example 1, above. Fermentation medium and inoculation of fermentation medium were the same as in Example 1, above. A series of six groups of 250 ml. Erlenmeyer flasks, each containing 25 ml. of inoculated fermentation medium, was employed as follows:

All inoculated flasks were incubated at 25° C. for 48 hours, on a rotary shaker operating at 180 revolutions per minute. At this point, a 10% urea solution was added to each of the first group of flasks so that each flask contained 2.52 grams of urea per liter. Flasks in groups 4–6 were retained as controls. All flasks were incubated at 25° C. for another 24 hours. At this point, a 10% urea solution was added to flasks in group 2 so as to give a concentration of 2.52 grams of urea per liter. All flasks were again incubated at 25° C. for another 24 hours, at which time a 10% urea solution was added to flasks in group 3 in amounts sufficient to give a concentration of 2.52 grams of urea per liter. All flasks were then incubated at 25° C. for an additional 24 hours, making a total of 120 hours fermentation in all cases. At each stage subsequent to the initial 48 hour fermentation period, flasks were removed from each group and the contents were assayed for 7-chlorotetracycline. Test results are shown in Tables III, IV, and V below:

TABLE III.—UREA ADDED AFTER 48 HOURS AND 7-CHLOROTETRACYCLINE OBTAINED—GROUP 1

| Duration of Fermentation, Hrs. | 7-Chlorotetracycline | | |
| --- | --- | --- | --- |
| | Controls, mcg./ml. | Urea after 48 Hrs., mcg./ml. | Difference, mcg./ml. |
| 48 | 1,460 | 1,460 | 0 |
| 72 | 1,750 | 3,150 | 1,400 |
| 96 | 3,200 | 5,500 | 2,300 |
| 120 | 2,900 | 7,700 | 4,800 |

TABLE IV.—UREA ADDED AFTER 72 HOURS AND 7-CHLOROTETRACYCLINE OBTAINED—GROUP 2

| Duration of Fermentation, Hrs. | 7-Chlorotetracycline | | |
| --- | --- | --- | --- |
| | Controls, mcg./ml. | Urea after 72 Hrs., mcg./ml. | Difference, mcg./ml. |
| 72 | 1,750 | 1,750 | 0 |
| 96 | 3,200 | | |
| 120 | 2,200 | 3,200 | 300 |

TABLE V.—UREA ADDED AFTER 96 HOURS AND 7-CHLOROTETRACYCLINE OBTAINED—GROUP 3

| Duration of Fermentation, Hrs. | 7-Chlorotetracycline | | |
| --- | --- | --- | --- |
| | Controls, mcg./ml. | Urea after 96 Hrs., mcg./ml. | Difference, mcg./ml. |
| 96 | 3,200 | 3,200 | 0 |
| 120 | 2,900 | 5,700 | 2,800 |

What is claimed is:

1. In a process for the production of antibiotics selected from the group consisting of tetracycline and 7-chlorotetracycline wherein a strain of *Streptomyces aureofaciens* is cultivated in a urea-free aqueous nutrient medium, the improvement which compries adding to said medium from about 1.0 g. to about 10.0 g. of urea per liter of medium at least twenty-four hours after inoculation of said medium.

2. In a process for the production of tetracycline wherein a tetracycline-producing strain of *Streptomyces aureofaciens* is cultivated in a urea-free aqueous nutrient medium, the improvement which comprises adding to said medium from about 1.0 g. to about 10.0 g. of urea per liter of medium at least twenty-four hours after inoculation of said medium.

3. In a process for the production of tetracycline wherein a 7-chlorotetracycline-producing strain of *Streptomyces aureofaciens* is cultivated in a urea-free aqueous nutrient medium containing a chlorination inhibitor, the improvement which comprises adding to said medium from about 1.0 g. to about 10.0 g. of urea per liter of medium at least twenty-four hours after inoculation of said medium.

4. In a process for the production of 7-chlorotetracycline wherein a 7-chlorotetracycline-producing strain of *Streptomyces aureofaciens* is cultivated in a urea-free aqueous nutrient medium, the improvement which comprises adding to said medium from about 1.0 g. to about 10.0 g. of urea per liter of medium at least twenty-four hours after inoculation of said medium.

References Cited in the file of this patent

Porter: Bacterial Chemistry & Physiology, John Wiley & Sons, Inc., New York, 1946, pages 844–849. (Copy in Div. 63.)